Aug. 12, 1924.  
G. A. ANDERSON  
AIR BRAKE  
Filed Jan. 19, 1923  
1,504,536  
2 Sheets-Sheet 1

WITNESSES  
INVENTOR  
G. A. ANDERSON  
BY  
ATTORNEYS

Aug. 12, 1924.
G. A. ANDERSON
1,504,536
AIR BRAKE
Filed Jan. 19, 1923    2 Sheets-Sheet 2
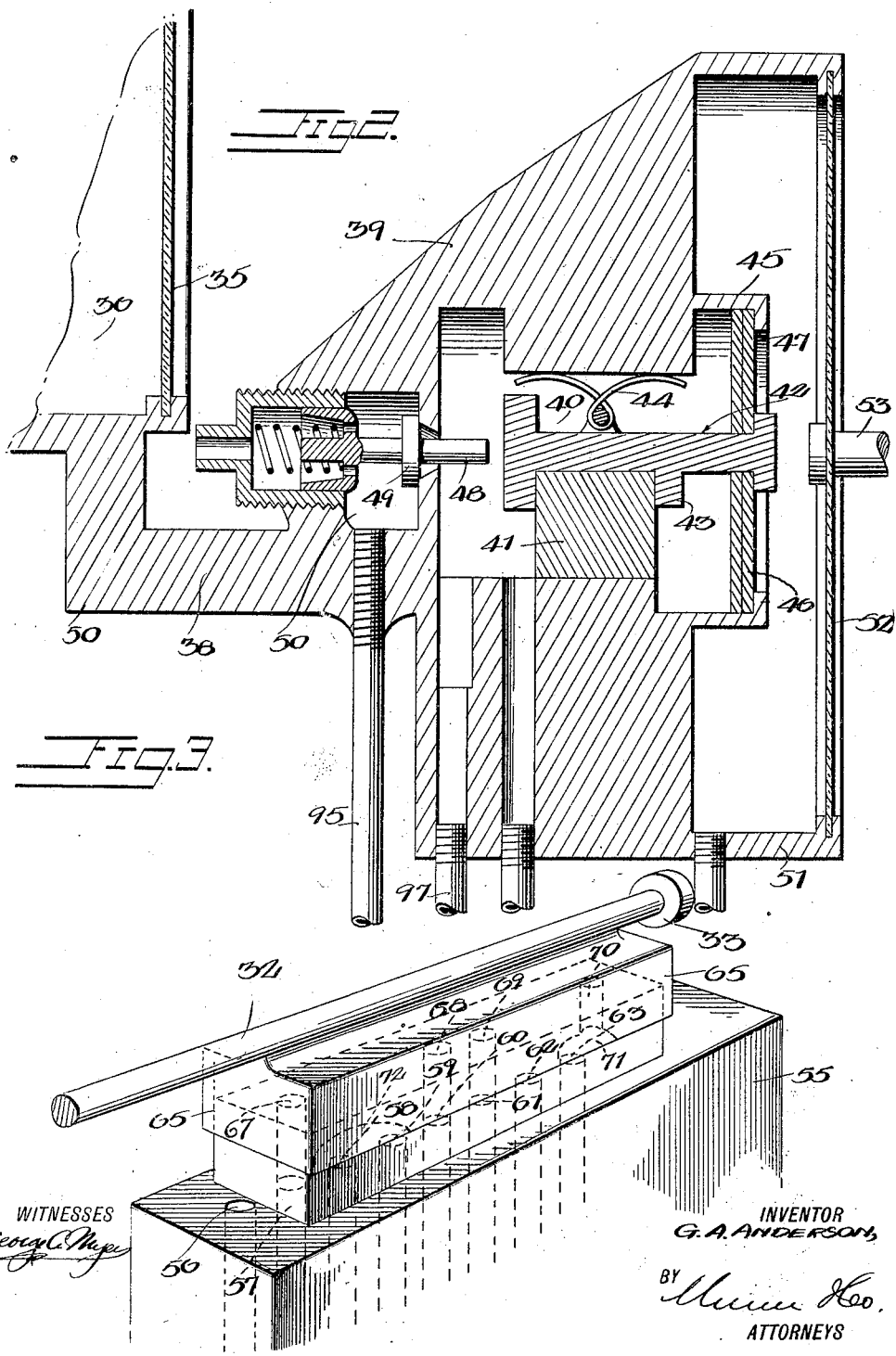
WITNESSES
INVENTOR
G. A. ANDERSON,
BY
ATTORNEYS Patented Aug. 12, 1924.

1,504,536

UNITED STATES PATENT OFFICE.

GEORGE ALUS ANDERSON, OF SANTA RITA, NEW MEXICO, ASSIGNOR OF ONE-EIGHTH TO WALTER M. MERCER, ONE-EIGHTH TO ROBERT T. TAPER, AND ONE-EIGHTH TO VICTOR H. WAGGONER, ALL OF SANTA RITA, NEW MEXICO.

AIR BRAKE.

Application filed January 19, 1923. Serial No. 613,701.

*To all whom it may concern:*

Be it known that I, GEORGE A. ANDERSON, a citizen of the United States, and a resident of Santa Rita, in the county of Grant and State of New Mexico, have invented certain new and useful Improvements in Air Brakes, of which the following is a specification.

This invention relates to improvements in air brakes.

This invention more particularly relates to air brakes of the type employed upon railway cars, and among the objects of the invention is to provide an air brake apparatus of this character which may be installed and operated in conjunction with the customary air brake equipment employed upon railway cars; which may be operated through the varying of pressure in the train pipe; which is exceedingly positive in operation; and which consists of simple parts not subject to getting out of operating order.

It is a further and important object of the invention that the apparatus be adapted to operate for service application of railway car brakes upon a slight decrease in the train pipe pressure, said decrease in the train pipe pressure being made from the engineer's cab in the usual manner.

It is also an object of the invention that the apparatus be adapted to insure high air pressure for an emergency application of the car brakes irrespective of the number of service applications preceding the emergency application.

It is a further object of the invention that the apparatus operate to establish communication between the train line pressure pipes and the atmosphere at the moment an emergency application is demanded and thereby to insure a full and complete emergency application.

Other objects, and objects relating to details of construction, combination and arrangement of parts will hereinafter appear in the detailed description to follow.

The invention is illustrated by way of example in the accompanying drawings, in which:—

Figure 2 is a fragmentary sectional view showing the particular construction of a slide valve and controlling means therefor employed in the present invention.

Figure 3 is a detailed perspective view illustrating the construction of a second slide valve used in connection with the present invention.

Figure 1:
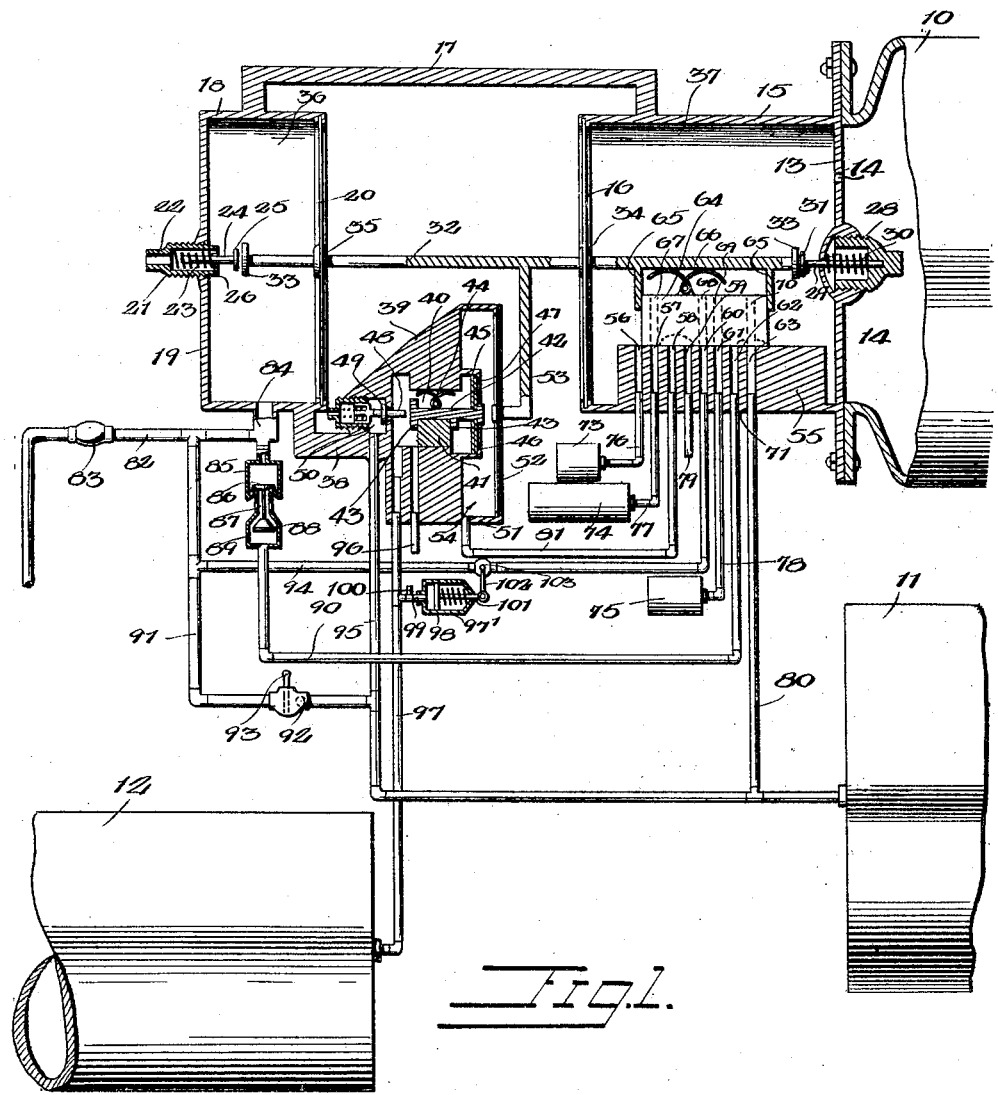
Figure 1 is a sectional plan view of an air brake apparatus or a unit embodying the present invention.

Referring to the drawings more particularly, 10 indicates generally the emergency reservoir and 11 the service reservoir. The reservoir 10 may be the auxiliary reservoir or tank commonly employed upon railway cars for air brake apparatus. The reservoir 11 is a tank in which air pressure is stored and utilized for service application. At 12 is indicated a brake cylinder.

To the reservoir or tank 10 there is secured a plate 13 which is provided with one or more orifices 14. The plate 13 is adapted to form a closure for the tank 10. The plate 13 is formed with a cylindrical extension 15 and in the outer end of this extension there is positioned a diaphragm 16. The extension 15 is also provided with an extension 17 which terminates in a cylindrical casing 18. The casing 18 has its one end formed with a closure 19 and in its other end there is positioned a diaphragm 20. The diaphragm 20 is slightly greater in diameter than the diaphragm 16. In the end closure 19 of the casing 18 there is transversely threaded a nipple 21, said nipple having a reduced bore portion 22 and in its inner end has positioned a coil spring 23 within which there is slidable a pin 24, said pin terminating at its outer end in a circular head 25. The pin is further supported by a spider 26 formed within the inner end of the nipple 21 and the pin may be depressed and its inner end extend into the reduced bore portion 22 of the nipple 21.

The plate 13 secured to the tank or reservoir 10 has also threaded therethrough a nipple 28 within which there is slidably positioned a pin 29, said pin being yieldably held against movement toward the interior of the tank or reservoir 10 by the compression spring 30. The pin 29 terminates at its forward end in a circular head 31 similar to the head 25 upon the pin 24. A rod 32 is provided which terminates at each end in a circular head 33. The rod 32 is in axial alinement with the pins 24 and 29 and adapted to extend in close relation to each of the pins 24 and 29. The rod 32 is secured to each of the diaphragms 16 and 20 as at 34 and 35 respectively.

It should be here noted that the diaphragm 20 associated with the casing 18 forms an enclosure or chamber 36 and the diaphragm 16 carried by the extension 15 forms an enclosure or chamber 37.

The casing 18 has formed therewith an arm or extension 38 which terminates in a casting 39 said casting being preferably of the shape shown. The casting 39 is formed with a longitudinally extending bore 40 within which there is slidable a block 41. Upon the block 41 there is positioned a piston rod 42 which is held against movement with relation to said block by the lugs 43. The member 42 is held in position upon the block 41 by the spring member 44, said spring member being of the usual construction employed for this purpose. The casting 39 is formed with an annular extension 45 within which the piston head 46 is slidable. The piston head 46 is suitably connected to the rod 42 as shown and the piston head is limited against outward movement with respect to the extension 45 by the means of the inturned flange 47. The other end of the member 42 is adapted to engage a spring pressed pin 48 when moved in an inward direction and said pin 48 carries a valve member 49 which is adapted to establish communication between the bore 40 and the cavity 50 when the valve 49 is unseated. The means for pressing the pin 48 to seat the valve member 49 are fully shown in the drawings and of conventional form.

The casting 39 is also provided or formed with an annular extension 51 and in the outer end of this extension there is secured a diaphragm 52, said diaphragm being connected to the rod 32 through the means of an arm 53. The arm 53 is connected to said diaphragm at a point centrally of the diaphragm as shown. The diaphragm 52 is adapted to form a closure in connection with the extension 51, said enclosure being in the form of a chamber and generally indicated by the reference numeral 54.

The extension 15 formed upon the plate 13 of reservoir or tank 10 is provided or formed upon its inner surface with a block 55, said block being provided with a plurality of transverse bores, said bores being indicated at 56, 57, 58, 59, 60, 61, 62 and 63. Upon the block 55, there is slidable longitudinally a second block 64 which is held to move with the rod 32 by the extensions 65 formed upon the rod 32. A spring 66 of conventional form is interposed between the rod 32 and the block 64 in order to insure that the block 64 will be in close contact with the block 55.

The block 64 is provided with a plurality of transversely extending bores, namely 67, 68, 69 and 70. The block 64 has its lower face provided with the two depressions or recesses as at 71 and 72, the recess 72 occurring between the bores 67 and 68 and the recess 71 occurring at the lower end of the bore 70.

There is further provided a tank 73 which hereinafter may be referred to as the emergency equalizing tank. There is also provided the tanks or reservoirs 74 and 75, the tank 74 being what may be termed an equalizing service reservoir, and the tank 75 a quick action reservoir. The tank 73 is connected through a pipe 76 with the bore 56 of the block 55. The tank 74 is likewise connected to a pipe 77 with the bore 57 of the block 55, and the tank 75 is connected through a pipe 78 with the bore 61 of the block 55. The bore 59 of the block 55 may communicate at its outer end with an exhaust pipe 79, while the bore 63 of the block 55 communicates through the pipe 80 with the service reservoir 11. It should be further noted that the chamber 54 formed in the one end of the casting 39 communicates through a pipe 81 with the bore 58 of the block 55.

At 82 is indicated the usual train pipe in which air pressure is supplied from the engine, and in this pipe there is interposed the usual strainer 83. The pipe 82 communicates with the interior of the chamber 36 through the nipple 84. The nipple 84 also communicates with a bowl 85 which supports a valve member 86, said valve member having a stem 87 which terminates at its lower end in a cylindrical member 88 which is disposed within a casing 89. The member 88 loosely fits within the casing 89 and when a sufficient air pressure is brought beneath the member 88, it is adapted to lift the valve 86 and permit air to escape through the lower end of the bowl 85. The interior of the casing 89 communicates through pipe 90 with the bore 62 of the block 65. A pipe 91 communicates at its one end with the train pipe 82 and at its other end with the application air pressure reservoir 11, and in this pipe there is interposed a one-way valve as at 92 which is adapted to permit air to flow from the train pipe 82 through pipe 91 into the reservoir 11, but excludes air to travel from the reservoir 11 to the train pipe 82. Forward to the valve 92 there is positioned in the pipe 91 a valve 93 whereby to restrict the opening or passage in the pipe 91. The pipe 91 is further connected through a pipe 94 with the bore 60 of the block 55, and also connecting with the chamber 50 of the casting 39 through a pipe 95.

The bore 40 of the casting 39 is provided with an exhaust 96, and also this bore communicates through a pipe 97 with the interior of the brake cylinder 12. A cylinder 97 is provided having positioned therein a piston 98 spring-pressed as shown toward the one end of the cylinder, and the interior of this cylinder is connected to the pipe 97 through the pipe 99, and in the pipe 99 there is interposed a suitable valve 100. The piston 98 carries a piston rod 101 which is connected through a crank arm 102 with a valve 103. Upon air being admitted through the pipe 97 into the interior of cylinder 97', the piston rod 98 will move for closing the valve 103. The purpose of this particular structure will be later described.

In Figure 1 of the drawing, the different valves are in position to indicate the movement when the train line 82 is capable of feeding air under high pressure to the brake apparatus. Under these conditions, the apparatus is operated in the following manner. Each of the reservoirs or tanks 10, 11, 73, 74, and 75 are being charged, that is, air is entering these tanks under pressure similar to that existing in the train line or pipe 82. Also a similar pressure is entering the chamber 36 and chamber 37. The air for charging the reservoir or tank 11 proceeds through the pipe 91 from the train line 82, through the valve 93, and from thence into the tank 11. Also this air pressure proceeds through the pipe 80, and from thence through the bores 63 and 70 into chamber 37 and from thence through the orifice 14 into the emergency reservoir 10. The block 64 being in the position shown in Figure 1, permits air at this time to proceed from the chamber 15 through the bore 69 in block 64, and from thence through the bores 61 in block 55, and then from pipe 78 into tank 75 which is the quick action reservoir. Air also may proceed from the chamber 37 through the bore 67 of block 64 through the bore 57 of block 55, and thence into the tank or reservoir 74. As shown in Figure 1, during this interval, the block 67 does not cover the bore 56 of block 55, and therefore air can proceed from the chamber 37 through this bore 56, through the pipe 76, into the tank 73.

Assuming that the conditions heretofore recited prevail, and that it is desired to make a service application of the brakes, the first step should be to slightly reduce the air pressure in the train line 82. With this occurring, the diaphragm 20 will be pressed inwardly and the diaphragm 16 pressed outwardly due to the fact that the pressure within chamber 37 will be greater than the pressure within chamber 36. This pressure of the diaphragm will cause movement of the rod 32, whereby to move the block 64 a sufficient degree to close the bores 67, 68, 69 and 70 in this block with relation to the communicating bores in the block 55. However, this movement of the block 64 will bring the depression or recess 72 in such a position that it will establish communication between pipe 77 and pipe 81, and thereby permit the pressure within the tank 74 to flow into the chamber 54, and this pressure is of such a degree that the same will move the piston rod 46 inwardly, and thereby move the block 41 so that the same closes the exhaust 96. The inward movement of the piston head 46 will be sufficient to bring the inner end of the piston rod 42 into engagement with the spring pressed pin 48, and thereby to unseat the valve 49 and establish communication between the chamber 50 bore and the pipe 97 whereby to apply the brakes. The service reservoir 11 is now directly connected to the brake cylinder 12, and this pressure being substantially equal to that existing within the chamber 54 will cause a re-adjustment of the member 42. That is, this member will slightly move away from the spring pressed pin 48, but not sufficient to open the exhaust 96. This last named position may be termed as a "lap" position, and in which position the member 42 may be maintained. The reason that this member is maintained in this position is due to the pressure existing in the tank or reservoir 74. That is, the pressure in this tank equalizes with the pressure in the tank 11, and thus maintains the member 42 in a neutral position.

It is of course obvious that should the brake cylinder 12 leak, and thus reduce the pressure existing in the chamber 40, the member 42 will again move further for depressing the pin 48 and thus to again establish the equal pressure between the brake cylinder 12 and reservoir 11. In this manner the leaky brake cylinders will not greatly interfere with the maintaining of a constant pressure upon the brakes.

When it is desired to release the brakes during this service application, then the pressure in the train pipe 82 should be increased to its original degree, and whereupon the diaphragm 20 will operate to bring the block 64 into its original position, and thus establish communication between the train pipe 82 and the different reservoirs or tanks, as heretofore described. At this moment, the depression 72 in the bottom of the slide blocks 64 will establish communication between the pipe 81 and the pipe 79, and thereby to permit the pressure within the chamber 54 to exhaust. Also at this interval, the block 41 will move to the position shown in Figure 1, and thus permit the air pressure within the brake cylinders to exhaust. Likewise the valve member 49 will become seated and thus close the communication between the bore 40 and the cavity 50. In case the valve 100 has been opened during the operation heretofore described, and permitted to be open, then upon the slide block 64 assuming its original position, the bore 68 of said block will be in position to establish communication between the chamber 37 and the pipe 94. As is obvious, the return of the train pipe pressure will be aided or augmented by the pressure from the tank or reservoir 10, and thus to more quickly bring the train pipe to its maximum.

In case an emergency application of the brakes is required, then the pressure in the train pipe 82 should be reduced to a greater extent than for the service application, and with the result that the diaphragms 20 and 16 will flex sufficiently to move the rod 32 a sufficient extent to bring the block 64 in a position whereby the depression 72 in its bottom face will establish communication between the pipes 76, 77 and 81.

The pressure from both reservoirs or tanks 73 and 74 will then be injected into the chamber 54 to operate the piston 47 and said piston will move to depress the pin 48 and establish communication between the cavity 50 and the bore 40, and thereby to permit the compressed air from the tank 11 to enter through the pipe 95 into bore 40 and from thence into the brake cylinders 12. Also at this period, the passage of bore 70 of the block 64 establishes communication with the pipe 80 and thereby to permit the air pressure from the tank 10 to enter tank 11, and thus to insure that air proceeding to the brake cylinders is of a sufficient quantity and degree of pressure. The pressure within the chamber 40 equalizes with the pressure within the chamber 50 in the manner heretofore described for the service application, and thus at all times to maintain a substantially constant air pressure within the brake cylinders 12.

It should be particularly noted that in order to insure that the train pipe pressure is properly reduced at the time of an emergency application, that I provide means for establishing communication between this train line 82 and the atmosphere. As this operation proceeds the movement of the block 64 to its position is caused by a quick drop of pressure in the chamber 36. Upon the block 64 moving to this position, the depression 71 establishes communication between the pipe 78 and pipe 90, thereby permitting the pressure from tank 75 to flow into the casing 89, and thus to lift the valve 86 and establish communication between the atmosphere and the pipe 82. As heretofore stated, the member 88 is loosely fitted within the casing 89, and thus the air within the tank 75 may escape from the casing 89 in a certain period. The member 88 is so fitted that it takes but a short length of time for the compressed air in tank 75 to escape, and after this air completely escapes the valve member 86 again becomes seated.

When it is desired to release the brakes after an emergency application, then the pressure in the train pipe 82 should be again established in order to move the rod 32 for returning the block 64 to its original position. At this time, if the valve member 100 is opened, the valve 103 will be operated to bring the reservoir 10 into communication with the train line 82 through the pipe 94 and thus to more quickly return the train line pressure to its original degree.

It should be noted that the diaphragms 16—20 and 52 are of such relative diameters that the least air pressure is required for flexing diaphragm 20, and that less air pressure is required to flex the diaphragm 16 than the diaphragm 52. This particular arrangement is necessary in order that the different pressures heretofore described will operate to move the rod 32 to the necessary positions for operating the valve member 64.

While I have shown and described the preferred form of my invention, I wish it to be understood that I am aware of the fact that the general combination and arrangement of parts may be changed by those skilled in the art without departing from the spirit of the invention, as indicated by the appended claims.

I claim:—

1. An air brake apparatus of the character described, including in combination, brake cylinders, a train pipe or line connected with a source of compressed air, a chamber communicating directly with said train pipe and having a depressible wall, means adapted to be actuated by said depressible wall whereby with the air pressure within the train pipe reaching a predetermined degree the reservoirs will be charged from said train pipe with compressed air, and means associated with said depressible wall whereby upon the air pressure within said train line or pipe receding or decreasing a predetermined degree, the reservoir will be connected to supply compressed air to said brake cylinder.

2. An air brake apparatus of the character described, including in combination, brake cylinders, a train pipe or line connected with a source of compressed air, a chamber communicating directly with said train pipe and having a depressible wall, means adapted to be actuated by said depressible wall whereby with the air pressure within the train pipe reaching a predetermined degree, the reservoirs will be charged from said train pipe with compressed air, and means associated with the depressible wall whereby upon the train line pressure decreasing a predetermined degree, the train line and reservoir will be directly connected to supply said brake cylinders with compressed air.

3. An air brake apparatus of the character described, including in combination, brake cylinders, a train pipe or line connected with a source of air pressure, a compressed air reservoir or tank having a depressible wall, a second tank or reservoir likewise having a depressible wall, and directly connected to said train line or pipe, means whereby upon the pressure in the train line assuming a certain degree, the compressed air may enter the first named reservoir or tank, and means operable for the connecting link between said depressible walls whereby upon the pressure within the train line decreasing a predetermined degree, the brake cylinders will be supplied with compressed air from the first named reservoir or tank.

4. An air brake apparatus of the character described, including in combination, brake cylinders, a train pipe or line connected with a source of air pressure, a compressed air reservoir or tank having a depressible wall, a second tank or reservoir likewise having a depressible wall, and directly connected to said train line or pipe, means whereby upon the pressure in the train line assuming a certain degree, the compressed air may enter the first named reservoir or tank, and means operable from the said connecting link between the depressible walls of said tanks or reservoirs whereby upon the air pressure decreasing within the train line a predetermined degree, the train line and first named reservoir will be directly connected for supplying compressed air to said brake cylinders.

5. An air brake apparatus of the character described, including in combination, brake cylinders, a train pipe or line connected with a source of air pressure, a compressed air reservoir or tank having a depressible wall, a second tank or reservoir likewise having a depressible wall, and directly connected to said train line or pipe, means whereby upon the pressure in the train line assuming a certain degree, the compressed air may enter the first named reservoir or tank, means operable from the said connecting link between the depressible walls of said tanks or reservoirs whereby upon the air pressure decreasing within the train line a predetermined degree, the train line and first named reservoir will be directly connected for supplying compressed air to said brake cylinders, and means operating in conjunction with the last named means whereby the pressure supplied to said brake cylinders will be constantly maintained.

6. An air brake apparatus of the character described, including in combination, brake cylinders, a train pipe or line connected with a source of air pressure, a compressed air reservoir or tank having a depressible wall, a second tank or reservoir likewise having a depressible wall, and directly connected to said train line or pipe, means whereby upon the pressure in the train line assuming a certain degree, the compressed air may enter the first named reservoir or tank, and means operable by the connecting link between the depressible walls whereby upon the train line pressure reaching a certain low degree, said train line will be directly connected with the atmosphere, and the first named reservoir connected for supplying compressed air to the brake cylinders.

7. An air brake apparatus of the character described, including in combination, brake cylinders, a train pipe or line connected with a source of air pressure, a compressed air reservoir or tank having a depressible wall, a second tank or reservoir likewise having a depressible wall, and directly connected to said train line or pipe, means whereby upon the pressure in the train line assuming a certain degree, the compressed air may enter the first named reservoir or tank, means operable by the connecting link between the depressible walls whereby upon the train line pressure reaching a certain low degree, said train line will be directly connected with the atmosphere, and the first named reservoir connected for supplying compressed air to the brake cylinders, and means whereby upon the pressure within the brake cylinders reaching the degree of the pressure within the reservoir connected therewith, the communication between said reservoir and brake cylinders will be discontinued.

8. An air brake apparatus of the character described, including in combination, brake cylinders, a train pipe or line connected with a source of air pressure, a compressed air reservoir or tank having a depressible wall, a second tank or reservoir likewise having a depressible wall, and directly connected to said train line or pipe, means whereby upon the pressure in the train line assuming a certain degree, the compressed air may enter the first named reservoir or tank, means operable by the connecting link between the depressible walls whereby upon the train line pressure reaching a certain low degree, said train line will be directly connected with the atmosphere, and the first named reservoir connected for supplying compressed air to the brake cylinders, means whereby upon the pressure within the brake cylinders reaching the degree of the pressure within the reservoir connected therewith, the communication between said reservoir and brake cylinders will be discontinued, and means whereby upon the pressure within the brake cylinders decreasing below that within the connected reservoirs, said pressures will be automatically balanced.

9. An air brake apparatus of the character described, including in combination, a train line or pipe connected to a source of compressed air, a brake cylinder, a pair of tanks, one of which is directly connected to said train line or pipe, a diaphragm forming a wall for each tank, a rigid connecting link between said diaphragms whereby the movement of one is imparted to the other, a slide valve within one of said tanks adapted to be operated by said rigid connecting link, means associated with said valve whereby upon the air pressure within said train line reaching a predetermined degree, communication between the train line and tank within which the slide valve is located will be brought into communication, and said means being also adapted to be operated upon the pressure within the train pipe reaching a predetermined degree to establish communication between said train pipe, the last named tank or reservoir, and the brake cylinders.

10. An air brake apparatus of the character described, including in combination, a train line or pipe connected to a source of compressed air, a brake cylinder, a pair of tanks, one of which is directly connected to said train line or pipe, a diaphragm forming a wall for each tank, a rigid connecting link between said diaphragms whereby the movement of one is imparted to the other, a slide valve within one of said tanks adapted to be operated by said rigid connecting link, means associated with said valve whereby upon the air pressure within said train line reaching a predetermined degree, communication between the train line and tank within which the slide valve is located will be brought into communication, and said means being also adapted to be operated upon the pressure within the train pipe reaching a predetermined degree to establish communication between said train pipe, the last named tank or reservoir, and the brake cylinders, a third tank or reservoir adapted to be charged during the charging period of the first named tank, and means whereby during the last named operation of the slide valve the third tank will operate to maintain the connection between the train line and the air tank in which said slide valve operates.

11. In a railroad brake apparatus including a plurality of reservoirs for compressed air, a triple valve, brake cylinders and a train line pressure pipe, means whereby compressed air may be delivered to the reservoir from the train line, and means whereby the pressure of one of said reservoirs may be utilized upon the reduction of the train line pressure to a predetermined degree for operating the triple valve to connect another reservoir with the brake cylinders.

12. In a railroad brake apparatus including a plurality of reservoirs for compressed air, a triple valve, brake cylinders and a train line pressure pipe, means whereby compressed air may be delivered to the reservoir from the train line, means whereby the pressure of one of said reservoirs may be utilized upon the reduction of the train line pressure to a predetermined degree for operating the triple valve to connect another reservoir with the brake cylinders, and means whereby pressure from one of the reservoirs may be utilized for operating a valve to open the train line pipe to the atmosphere when the pressure within said train line pipe is quickly reduced.

13. In a railroad brake apparatus, a fixed plug having a plurality of openings, each of which terminates in one face of the block, a second block slidable upon the first-named block and having a plurality of passages which may be brought to register with the passages of the first-named block.

14. In a railroad brake apparatus, a fixed plug having a plurality of openings, each of which terminates in one face of the block, a second block slidable upon the first-named block and having a plurality of passages which may be brought to register with the passages of the first-named block, an enclosure within which said blocks may be positioned, a diaphragm for said closure, means whereby air pressure may be delivered within the enclosure for flexing said diaphragm, and connecting means between the diaphragm and said slidable block.

15. In a railroad brake apparatus of the character described, a triple valve, an extension therefor whereby to provide a chamber, and means whereby air pressure may be employed, a piston carried by the slide valve adapted to be actuated by air pressure within said chamber, and connecting means between the slide valve of said triple valve and said piston, for the purpose described.

16. In a railroad brake apparatus of the character described, a triple valve, an extension therefor whereby to provide a separate chamber, a flexible wall for said chamber, means whereby compressed air within said chamber may be utilized for operating the slide valve of said triple valve, and means connected to said flexible wall whereby to enable the control of compressed air within said chamber.

17. In a railroad brake apparatus of the character described, a flexible wall for each enclosure, a stationary block within one enclosure having a plurality of openings, each opening terminating in one face thereof, a slidable block upon the last-named face of the stationary block and adapted to establish communication between openings in said block, a connection between said slide block and the connecting means between said flexible walls, and means whereby fluid pressure within the enclosure may be utilized for controlling the position of said slidable block.

GEORGE ALUS ANDERSON.